UNITED STATES PATENT OFFICE.

EDWIN B. LARCHER, OF NEW YORK, N. Y.

IMPROVED METHOD OF PREPARING FLOUR AND MEAL FOR TRANSPORTATION.

Specification forming part of Letters Patent No. 48,697, dated July 11, 1865; antedated June 28, 1865.

*To all whom it may concern:*

Be it known that I, EDWIN B. LARCHER, of the city and State of New York, have invented, made, and applied to use a certain new and useful Improvement in Preparing Flour, Meal, &c., for Transportation; and I do hereby declare the following to be a full, clear, and exact description of the same, and of the features that distinguish it from all previous inventions.

Flour and meal have heretofore been packed in barrels, to get more of the same into a given space than could be introduced by the usual shaking down and packing by hand. In all cases, however, the flour or meal is exposed to atmospheric influences, and will often sour and become useless in warm climates.

My invention has for its object the preservation of flour or meal by preventing atmospheric action, and also the reduction of the bulk, so that less room will be required for transportation.

The nature of my said invention consists in compressing flour or meal sufficiently to drive out nearly or quite all the air contained in such flour or meal after grinding, which compression greatly reduces the bulk, and makes a hard cake or mass of such meal or flour. Thus much less space is occupied in transportation, and the flour is preserved from atmospheric influences almost entirely.

I prefer that the flour or meal be compressed by a hydraulic or other powerful press into cakes or layers of a suitable size for handling, and that these be of a shape adapted to being packed together in boxes, barrels, or packages. The cakes or masses of flour thus packed together may be also protected from atmospheric influence by a coating of sizing, paste, starch, or a varnish, for I find that any material of this kind that will dry quickly penetrates the flour but little and will cause the flour to remain sweet for a much longer time than the ordinary flour will under the same circumstances.

Flour prepared on my plan is especially adapted for the stores of vessels going on long voyages, or to tropical climates, both on account of the bulk as well as its proof against atmospheric influences and dampness.

When this flour or meal is to be used I soak the same in water, which will gradually permeate the mass, swell and soften the same, so that it can be mixed up as usual.

What I claim, and desire to secure by Letters Patent, is—

The preparation of flour or meal for its preservation by compressing the same, as and for the purposes specified.

In witness whereof I have hereunto set my signature this 15th day of December, 1864.

EDWIN B. LARCHER.

Witnesses:
LEMUEL W. SERRELL,
CHAS. H. SMITH.